(12) United States Patent
Sakakibara

(10) Patent No.: US 7,777,922 B2
(45) Date of Patent: Aug. 17, 2010

(54) IMAGE READER

(75) Inventor: Akihiro Sakakibara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 992 days.

(21) Appl. No.: 11/537,464

(22) Filed: Sep. 29, 2006

(65) Prior Publication Data

US 2007/0109613 A1    May 17, 2007

(30) Foreign Application Priority Data

Sep. 30, 2005    (JP) ............................. 2005-286464

(51) Int. Cl.
*H04N 1/04*    (2006.01)
*H04N 1/46*    (2006.01)
(52) U.S. Cl. ...................... 358/474; 358/513; 358/482; 358/483
(58) Field of Classification Search ................. 250/200, 250/559.05, 559.06, 559.07, 559.08, 208.1; 382/312, 313; 358/505, 508, 513, 514, 400, 358/474, 482, 483, 486, 494, 496, 497, 498
See application file for complete search history.

(56) References Cited

U.S. PATENT DOCUMENTS

| | | | | |
|---|---|---|---|---|
| 5,281,803 A * | 1/1994 | Ishizuka | .................. | 250/208.1 |
| 7,095,003 B2 * | 8/2006 | Matsumoto | .............. | 250/208.1 |
| 7,133,165 B2 * | 11/2006 | Yamada et al. | .............. | 358/474 |
| 7,235,769 B2 * | 6/2007 | Uemura | .................... | 250/208.1 |
| 7,391,544 B2 * | 6/2008 | Yokota | ........................ | 358/487 |
| 7,535,602 B2 * | 5/2009 | Ohara | ......................... | 358/474 |
| 7,616,352 B2 * | 11/2009 | Okuda | ........................ | 358/474 |

FOREIGN PATENT DOCUMENTS

JP    2005167817 A    6/2005

* cited by examiner

*Primary Examiner*—Jerome Grant, II
(74) *Attorney, Agent, or Firm*—Baker Botts L.L.P.

(57) ABSTRACT

In an image reader that can adjust a distance between a platen glass and a close-contact-type image sensor (CIS) without disassembly, a CIS unit includes a CIS and a resilient body which biases the CIS toward the platen glass. A CIS roller holder includes a spacer, and a CIS holder which holds the spacer movably in the vertical direction as well as in the sub scanning direction with respect to the platen glass and is fixed to the CIS unit. Irregularities are formed on surfaces of the CIS holder and the spacer which face each other and are engageable by fitting. When the CIS unit is moved in the sub scanning direction and the CIS roller holder is brought into contact with one rib, the CIS roller holder is brought into contact with the spacer at projections or recesses, thus changing a distance between the platen glass and the CIS.

12 Claims, 11 Drawing Sheets

IMAGE READER

CROSS-REFERENCE TO RELATED APPLICATIONS

This application claims priority from Japanese Patent Application No. P2005-286464, filed on Sep. 30, 2005, the entire subject matter of which is incorporated herein by reference.

BACKGROUND OF THE INVENTION

1. Field of the Invention

Illustrative aspects of the present invention relate to an image reader that reads an image using a close-contact-type image sensor.

2. Description of the Related Art

Conventionally, as an image reader, which is mounted on a facsimile, a copying machine or the like, an image reader which uses a close-contact-type image sensor (CIS: Contact Image Sensor) is known.

The CIS is advantageous compared with an image sensor of a charge Coupled Devices (CCD) method with respect to a point that the CIS can be largely miniaturized and can largely reduce a weight thereof. On the other hand, compared with the image sensor of the CCD method, the CIS has a drawback that a focusing depth is extremely shallow and a range in which an image can be clearly read is narrow. For example, when a focusing point of the CIS is positioned on an upper surface of the platen glass and a document is placed on a surface of the platen glass, an image of a document which is printed on a portion slightly floated from the surface of the platen glass is read blurred out of focus. Accordingly, at the time of shipment from a factory, although it is possible to perform the clear reading over the whole document with respect to non-wrinkled document when the adjustment is made to position the focusing point of the CIS on an upper surface of the platen glass, when an image is read from a book in a spread state or an image is read from a wrinkled document, an image which is read at a portion floated from the surface of the platen glass becomes obscure.

Further, since the focusing depth is extremely shallow as described above, when the image readers are produced in a mass production basis by uniformly setting a distance between the platen glass and the CIS, due to the irregularities in size or the like between the CIS and other parts, there exists a possibility of manufacturing an image reader in which the focusing point of the CIS is not positioned above the upper surface of the platen glass.

Accordingly, in a plant which manufactures image readers using the CIS, with respect to each one of the image reader to be manufactured, the distance between the platen glass and the CIS (hereinafter referred to as "glass-CIS distance") is adjusted using spacers which differ in thickness or screw height adjusting screws (for example, see J-P-A-2005-167817) so as to position a focusing point of the CIS on an upper surface of the platen glass. That is, the adjustment of the distance between the platen glass and the CIS using the spacers or the height adjusting screws is performed manually.

SUMMARY OF THE INVENTION

However, there has been a drawback that when it is necessary to readjust the distance between the platen glass and the CIS with respect to the once-assembled image reader at the time of shipment from a factory, there has been a drawback that it is necessary to disassemble the image reader so as to manually handle the spacers and the height adjustment screws which are mounted in the inside of the image reader.

Further, since it is necessary to disassemble the image reader to adjust the distance between the platen glass and the CIS as described above, a user of the image reader cannot adjust the distance between the platen glass and the CIS after purchasing the image reader.

Aspects of the invention provide an image reader that can adjust a distance between a platen glass and a close-contact-type image sensor without disassembly.

according to an aspect of invention, there is provided an image reader which includes a platen glass which has a placing surface on which an original on which an image is formed is placed; a close-contact-type image sensor which linearly arranges a plurality of reading elements for reading an image along the main scanning direction; a sensor support member which is arranged on a side of the platen glass opposite to a side at which the original is placed in a state that the sensor support member faces the platen glass in an opposed manner and supports the close-contact-type image sensor; and a support member moving unit which moves the sensor support member in the sub scanning direction which is in parallel to the placing surface and intersects the main scanning direction; and a distance adjusting unit which is configured to be capable of adjusting a distance between the platen glass and the close-contact-type image sensor using a slidable spacer, wherein the spacer is slidable due to contacting of the spacer with spacer contact members which are arranged at both end portions in the sub-scanning direction of the close-contact-type image sensor.

In the image reader having such a constitution, by allowing the support member moving unit to move the sensor support member in the sub scanning direction, the image formed on the original, which is placed on the platen glass, is read by the close-contact-type image sensor.

Further, by allowing the support member moving unit to move the sensor support member to the moving blocking position, the spacer is brought into contact with the spacer contact member. Due to this contacting of the spacer, the spacer is made to slide. In response to such sliding of the spacer, the distance adjusting unit changes a distance between the platen glass and the close-contact-type image sensor (hereinafter also referred to as a glass-CIS distance). That is, by bringing the spacer into contact with the spacer contact member thus making the slider slide, it is possible to adjust a focusing center position of the close-contact-type image sensor. Here, the focusing center position implies a position at which the close-contact-type image sensor is focused. Further, it is unnecessary to perform the manual operation to adjust the glass-CIS distance and hence, it is possible to adjust the distance between the platen glass and the close-contact-type image sensor without disassembling the image reader.

Still further, by preliminarily setting a sliding quantity of the spacer, it is possible to finely adjust the glass-CIS distance.

BRIEF DESCRIPTION OF DRAWINGS

Aspects of the invention will be described in detail with reference to various example structures and the following figures, wherein.

DESCRIPTION OF EMBODIMENTS

Embodiments of the present invention will be described in conjunction with drawings hereinafter.

Figure 1:
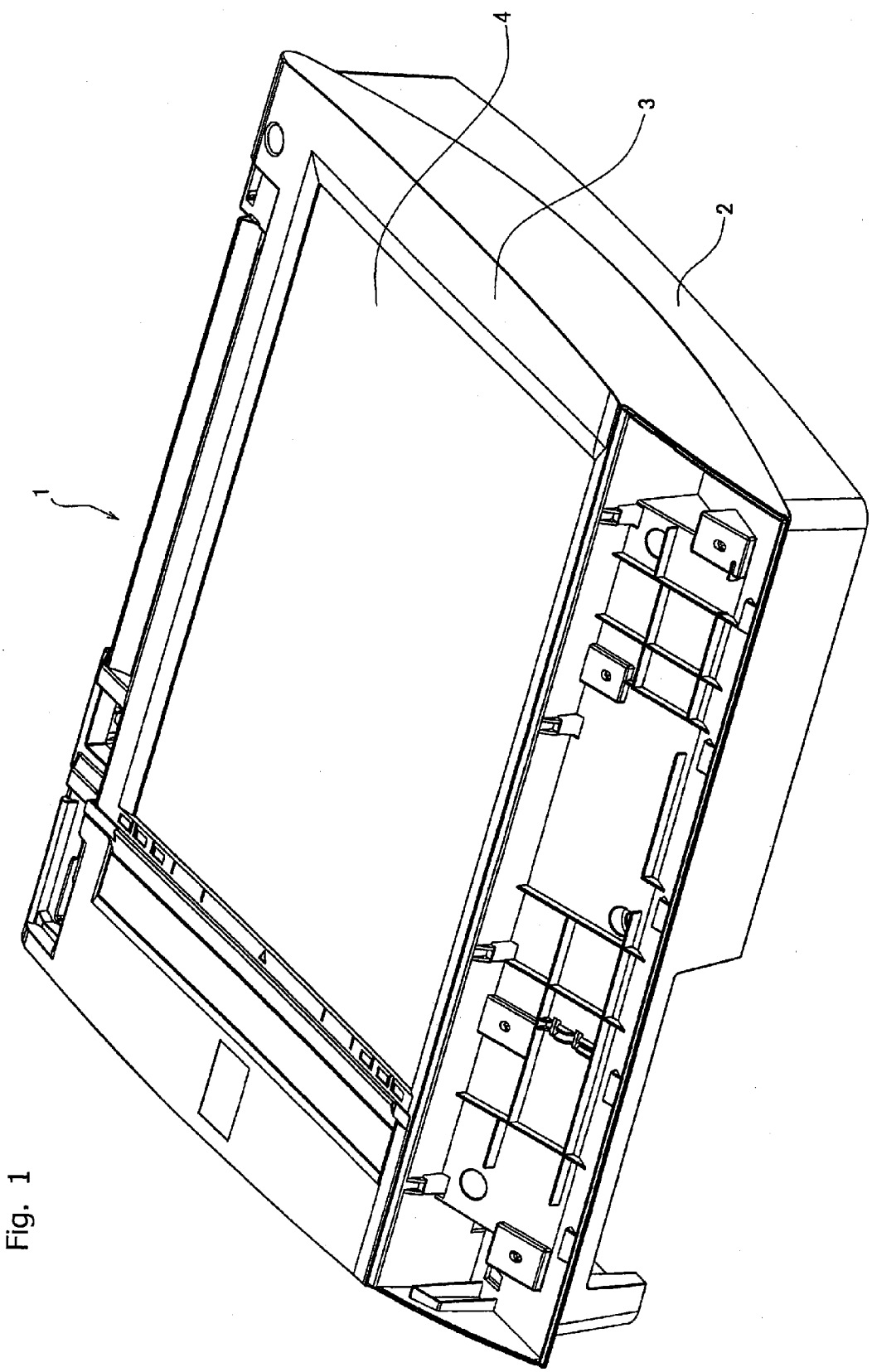
FIG. 1 is a perspective view showing an appearance of a scanner device 1.

As shown in FIG. 1, a scanner device 1 is of a flat bed type. The scanner device 1 includes a housing 2 which is formed in a box shape with an upper surface thereof opened and houses constitutional elements of the scanner device 1 in the inside thereof, a rectangular shaped platen glass 4 which is arranged at the center of an upper-surface opening portion of the housing 2 and on which a document is placed, and an upper-surface cover 3 which is arranged on a peripheral portion of the upper-surface opening portion of the housing 2 and supports the platen glass 4.

Figure 2:
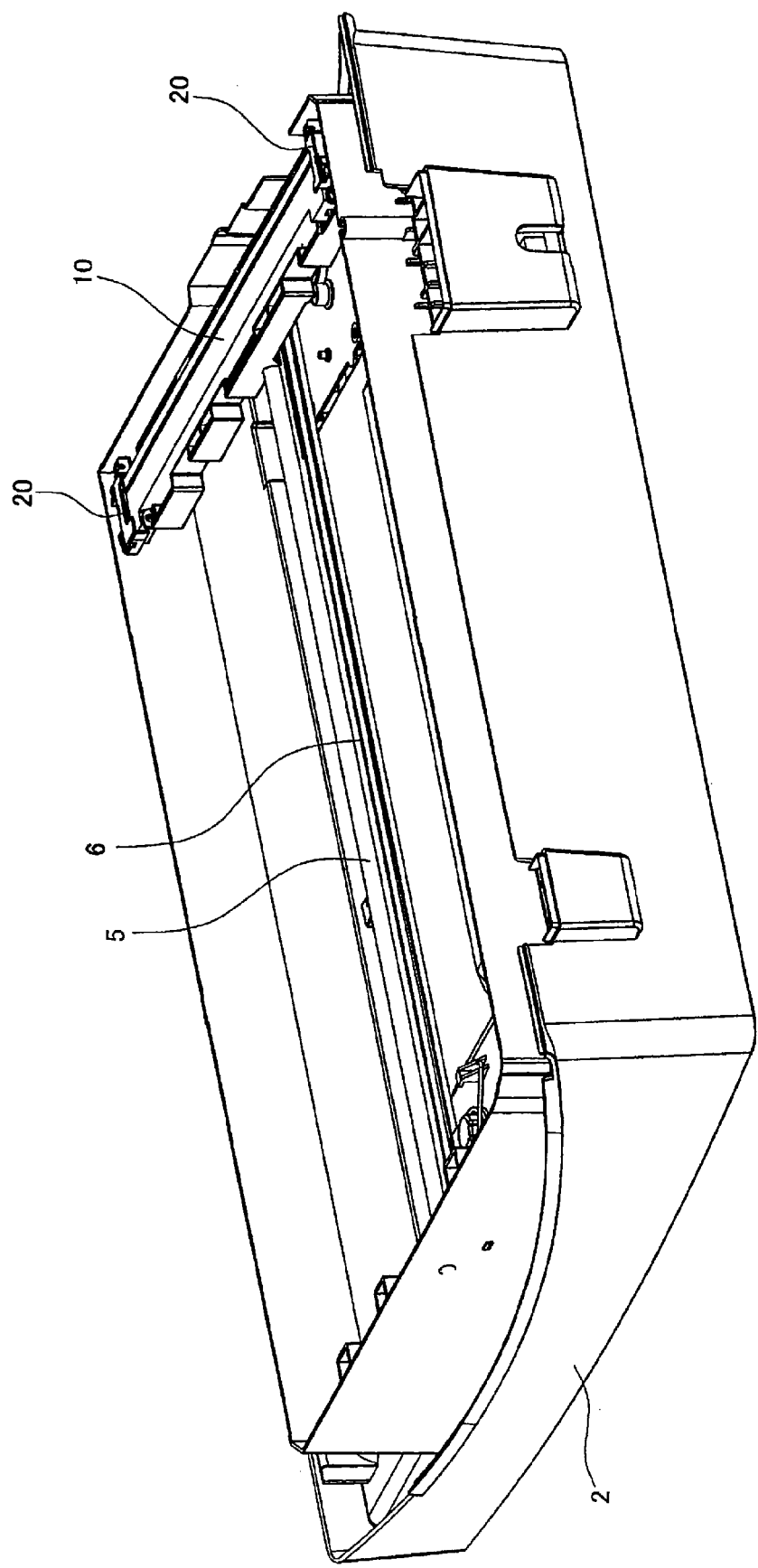
FIG. 2 is a perspective view showing the inner constitution of the scanner device 1.

Further, as shown in FIG. 2, in the housing 2, a close-contact-type image sensor unit (hereinafter referred to as CIS unit) 10, a guide shaft 5, and an endless belt 6 are housed. The CIS unit 10 has a close-contact-type image sensor 12 (see FIG. 3A and FIG. 3B, hereinafter referred to as the CIS) in which a plurality of reading elements formed of a photoelectric conversion element are arranged linearly along the main scanning direction (lateral direction of the platen glass 4, see FIG. 1). The CIS unit 10 is configured to read an image printed on a document which is placed on the platen glass 4. The guide shaft 5 is configured to movably guide the CIS unit 10 along the sub scanning direction (the longitudinal direction of the platen glass 4, see FIG. 1). The endless belt 6 is extended along the sub scanning direction and is configured to move in a circulating manner due to a drive force transmitted from a stepping motor 52 (see FIG. 8, not shown in FIG. 2) by way of a gear mechanism (not shown).

Here, the CIS unit 10 is fixed to the endless belt 6 so as to move along with the circulating movement of the endless belt 6. Accordingly, the CIS unit 10 reciprocally moves along the sub scanning direction while being guided by the guide shaft 5 in an interlocking manner with the circulating movement of the endless belt 6.

Further, a CIS roller holder 20 is mounted on each end of the CIS unit 10 with respect to the main-scanning-direction. The CIS roller holder 20 rotatably supports rollers 23 (see FIG. 3A and FIG. 3B) which contact a lower surface of the platen glass 4, opposite to a surface on which the document is placed (hereinafter, referred to as an upper surface). The CIS roller holder 20 also adjusts a distance between the platen glass 4 and the CIS 12 (hereinafter, referred to as glass-CIS distance) is mounted.

Figure 3A:
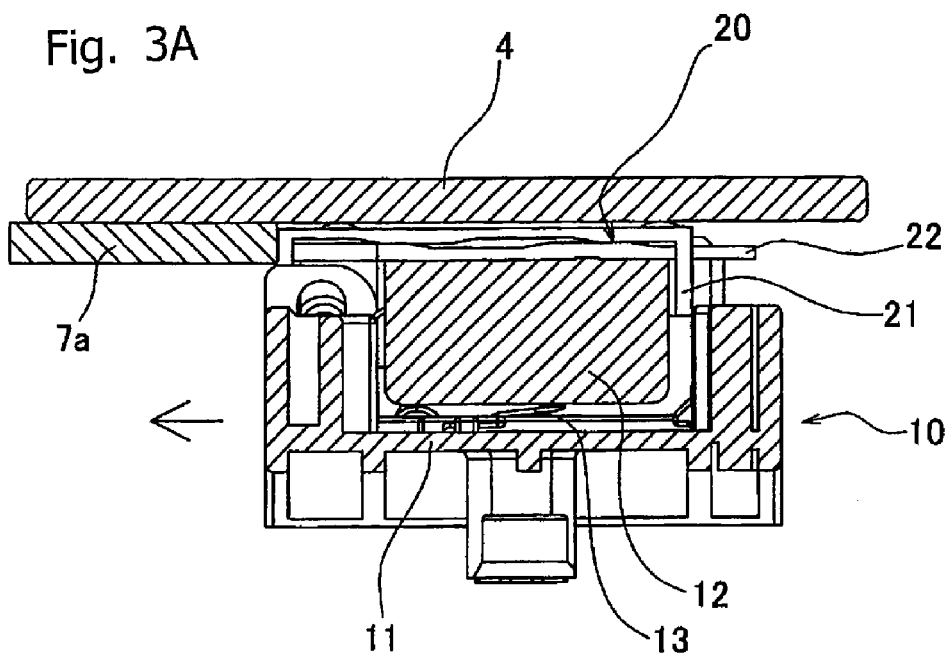
FIG. 3A and FIG. 3B are side cross-sectional views of a CIS unit 10 and a CIS roller holder 20.
Figure 3B:
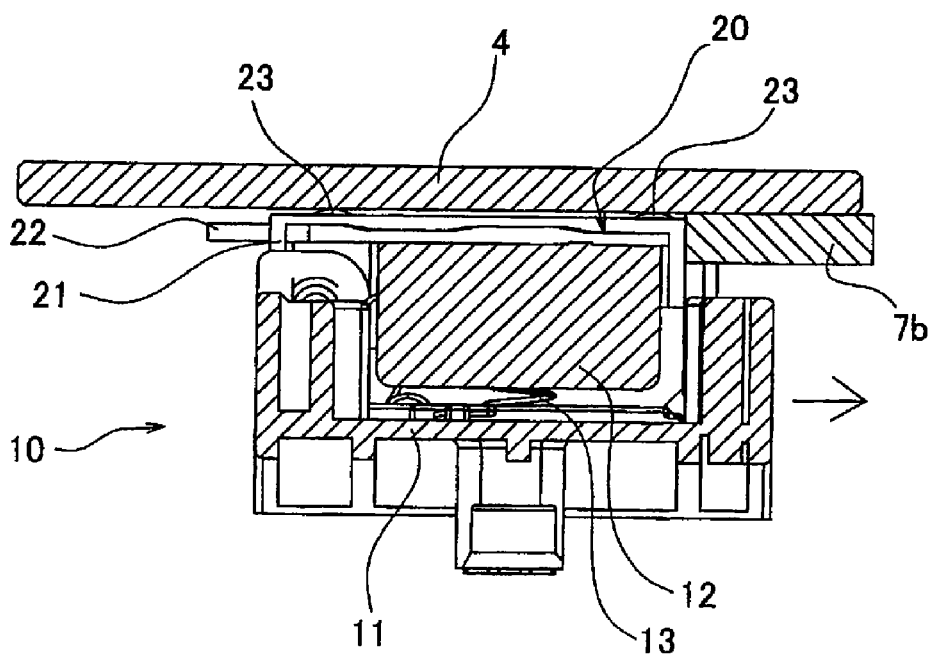

FIG. 3A and FIG. 3B are side cross-sectional views of the CIS unit 10 and the CIS roller holder 20, wherein FIG. 3A shows a case in which the glass-CIS distance is large and FIG. 3B shows a case in which the glass-CIS distance is small.

Figure 4A:
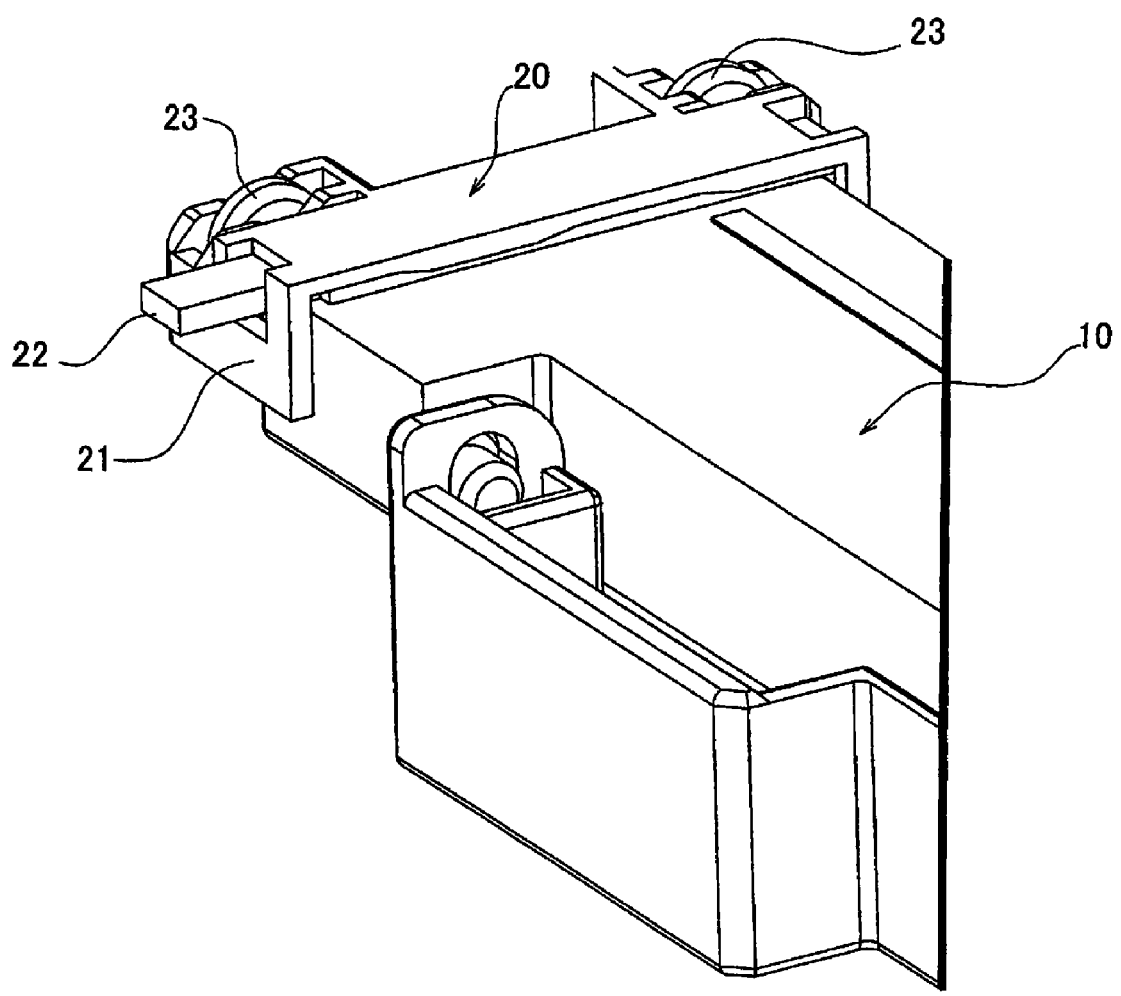
FIG. 4A and FIG. 4B are perspective views showing an appearance of the CIS roller holder 20.
Figure 4B:
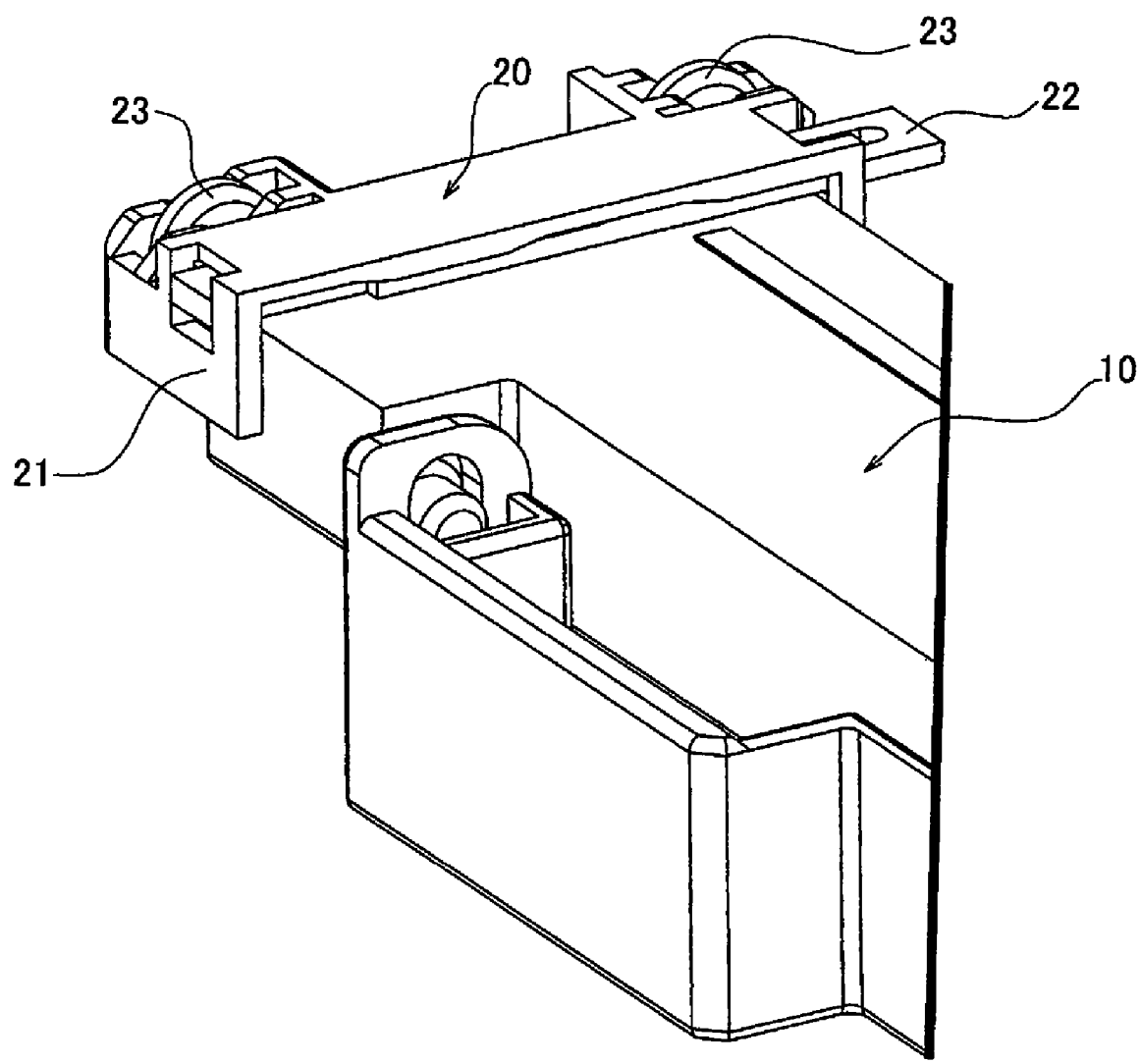
Figure 5A:
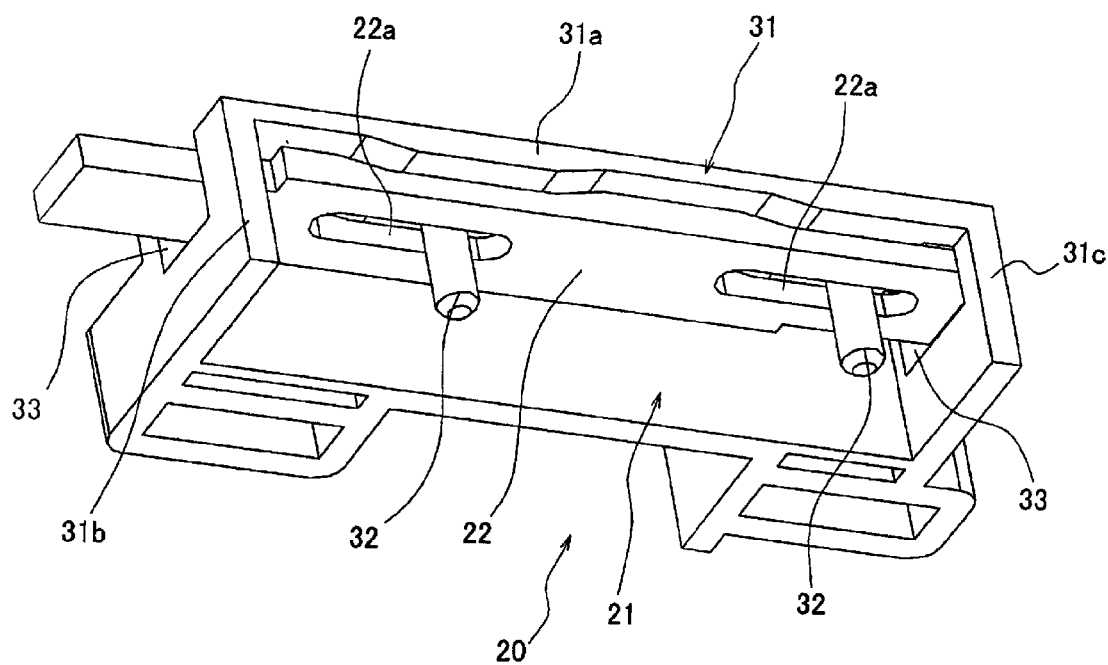
FIG. 5A and FIG. 5B are perspective view showing the inner structure of the CIS roller holder 20.
Figure 5B:
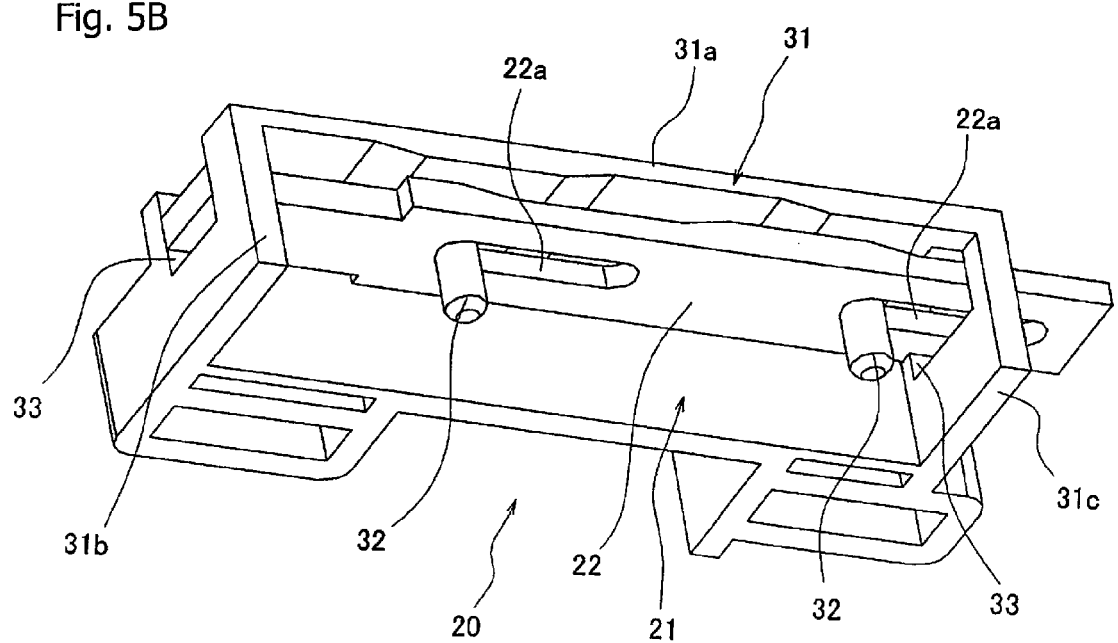

Further, FIG. 4A and FIG. 4B are perspective views showing an appearance of the CIS roller holder 20, and FIG. 5A and FIG. 5B are perspective views showing the inner structure of the CIS roller holder 20. FIG. 4A and FIG. 5A show a case in which the glass-CIS distance is small. FIG. 4B and FIG. 5B show a case in which the glass-CIS distance is large.

Figure 6:
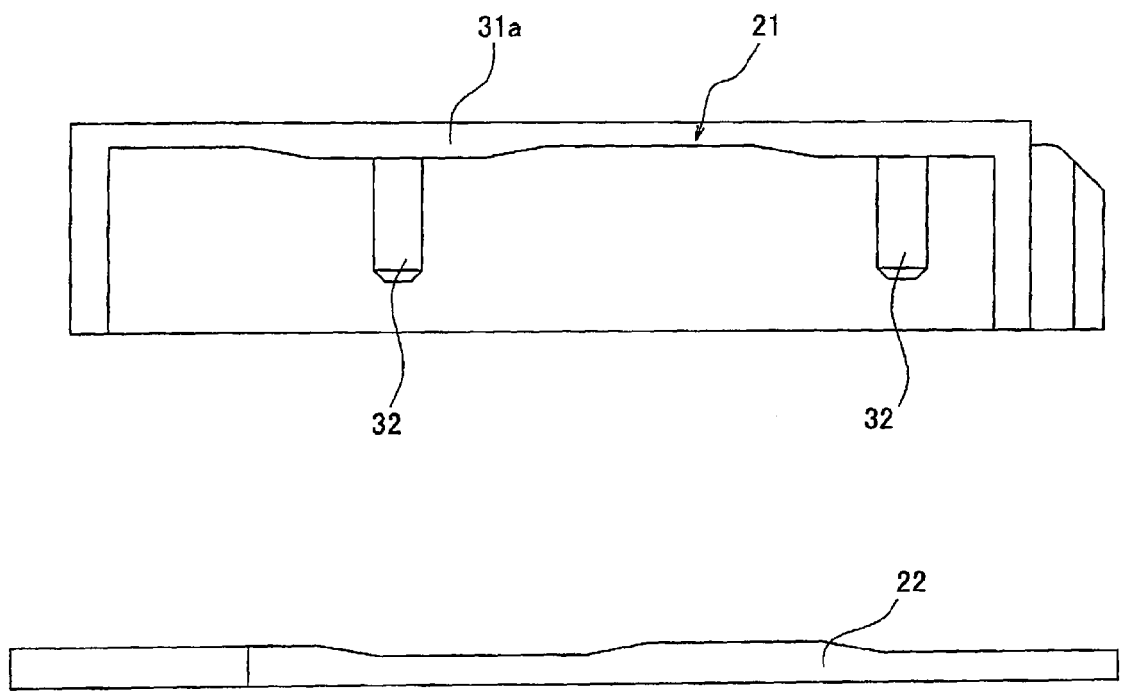
FIG. 6 is a side view of a CIS holder 21 and a spacer 22.

Further, FIG. 6 is a side view of a CIS holder 21 (described later) and a spacer 22 (described later).

As shown in FIG. 3A and FIG. 3B, the CIS unit 10 is constituted of the CIS 12, a carriage 11 which mounts the CIS 12 thereon, and a resilient body 13 (for example, a coil spring) which has one end thereof fixed to the CIS 12 and another end thereof fixed to the carriage 11, and biases the CIS 12 in the direction that the CIS 12 approaches the platen glass 4 (hereinafter, referred to as the sensor approaching direction).

Further, the CIS roller holder 20 is constituted of, as shown in FIG. 3A, FIG. 3B, FIG. 4A and FIG. 4B, the rollers 23, a thin-plate-like spacer 22 which is formed in a rectangular shape by molding, and the CIS holder 21 which rotatably supports the rollers 23 and holds the spacer 22 in a state that the spacer 22 is movable in the vertical direction with respect to an upper surface of the platen glass 4 (hereinafter, referred to as the glass vertical direction) and is movable in the sub scanning direction, and is fixed to the end of the CIS unit 10 with respect to the main scanning.

As shown in FIG. 5A and FIG. 5B, spacer through holes 22a which extend in the longitudinal direction of the spacer 22 are formed in the spacer 22. Further, on a surface of the spacer 22 which faces the platen glass 4 (hereinafter, referred to as a spacer upper surface), wave-like irregularities are formed in a curved shape (see FIG. 6).

Further, the CIS holder 21 includes a holder body portion 31 having a U-shaped cross section which opens downwardly. On an inner surface of an upper surface wall 31a of the holder body portion 31, pin-shaped projections 32 which project in the vertical direction with respect to the upper surface wall 31a and are inserted into the spacer through holes 22a are mounted. Further, on the inner surface of the upper surface wall 31a (hereinafter referred to as an upper-surface-wall inner surface), curved wavelike irregularities, which are engageable by fitting with irregularities formed on the spacer upper surface, are formed (see FIG. 6). Further, on side surface walls 31b, 31c of the holder body portion 31, holder through holes 33, which allows the insertion of the spacer 22 therein, are formed.

Accordingly, by housing the spacer 22 in the inside of the holder body portion 31 in a state that the pin-shaped projections 32 are inserted into the spacer through holes 22a and, at the same time, the spacer 22 is inserted into the holder through holes 33, the CIS holder 21 can hold the spacer 22 such that the spacer 22 is movable in the vertical direction with respect to the upper surface wall 31a and is movable in the longitudinal direction thereof.

Then, when the CIS holder 21 is mounted on the CIS unit 10, the spacer 22 is arranged between the upper surface wall 31a of the holder body portion 31 and the CIS 12. That is, a biasing force of the resilient body 13 is applied to the spacer 22 by way of the CIS 12 and hence, the spacer 22 presses the upper surface wall 31a in the sensor approaching direction.

Accordingly, when the upper-surface-wall inner surface and the spacer upper surface are engaged with each other by fitting (hereinafter, referred to as a fitting state) along with the movement of the spacer 22 in the longitudinal direction, as show in FIG. 3B, the glass-CIS distance becomes the smallest. On the other hand, when the engagement by fitting between the upper-surface-wall inner surface and the spacer upper surface is released and a projecting portion of the upper-surface-wall inner surface and a projecting portion of a spacer upper surface are brought into contact with each other (hereinafter referred to as a projection contact state), as shown in FIG. 3A, the glass-CIS distance becomes the largest.

Here, in the projection contact state, the focusing center position of the CIS 12 is adjusted using a related art (spacers having different thicknesses or a height adjusting screw) to obtain the glass-CIS distance which allows the focusing center position of the CIS 12 to agree with the upper surface of the platen glass 4.

Figure 7:
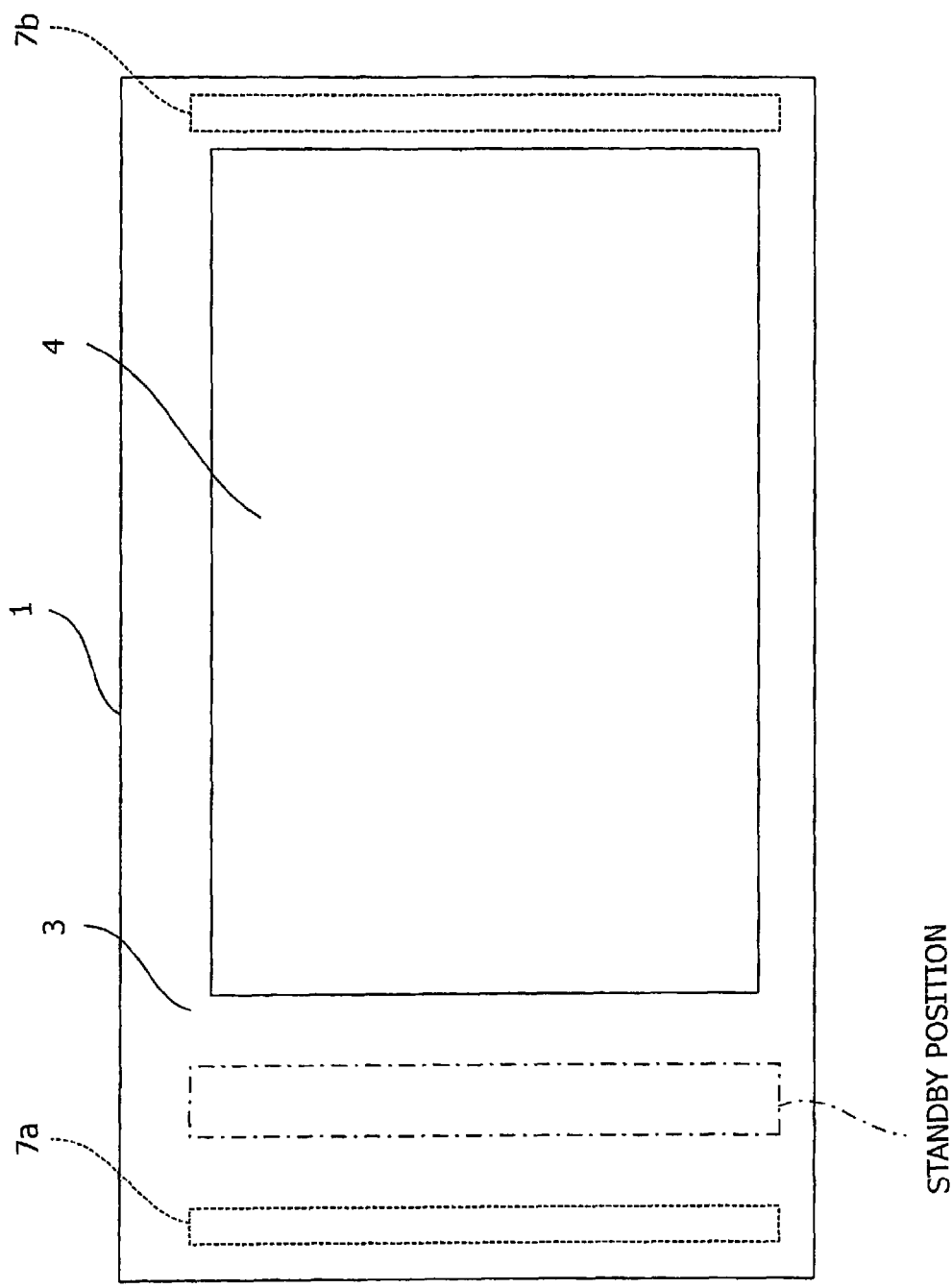
FIG. 7 is a schematic plan view of the scanner device 1.

FIG. 7 is a schematic plan view of the scanner device 1 illustrating the arrangement of ribs 7a, 7b and a standby position of the CIS unit 10.

As shown in FIG. 7, the rib 7a and the rib 7b which extend along the main scanning direction are disposed on one end of the housing 2 with respect to the sub-scanning direction (the left side in the drawing) and the other end thereof (the right side in the drawing) respectively. The ribs 7a and 7b project from a lower surface of the upper surface cover 3 at a height where the rib 7a and the rib 7b contact the CIS holder 21 and the spacer 22 but do not contact the CIS unit 10 (see FIG. 3).

Further, a standby position of the CIS unit 10 that does not read images is set at a middle portion between the platen glass 4 and the rib 7a along the sub scanning direction.

Further, the shapes of irregularities of the upper-surface-wall inner surface and the spacer upper surface are set such that, when the CIS holders 21 are brought into contact with the rib 7a, the projections formed on the upper-surface-wall inner surface and the spacer upper surface come into the projection contact state (see FIG. 3A), while when the CIS holders 21 are brought into contact with the rib 7b, the projections formed on the upper-surface-wall inner surface and the spacer upper surface come into the fitting state (see FIG. 3B).

Figure 8:
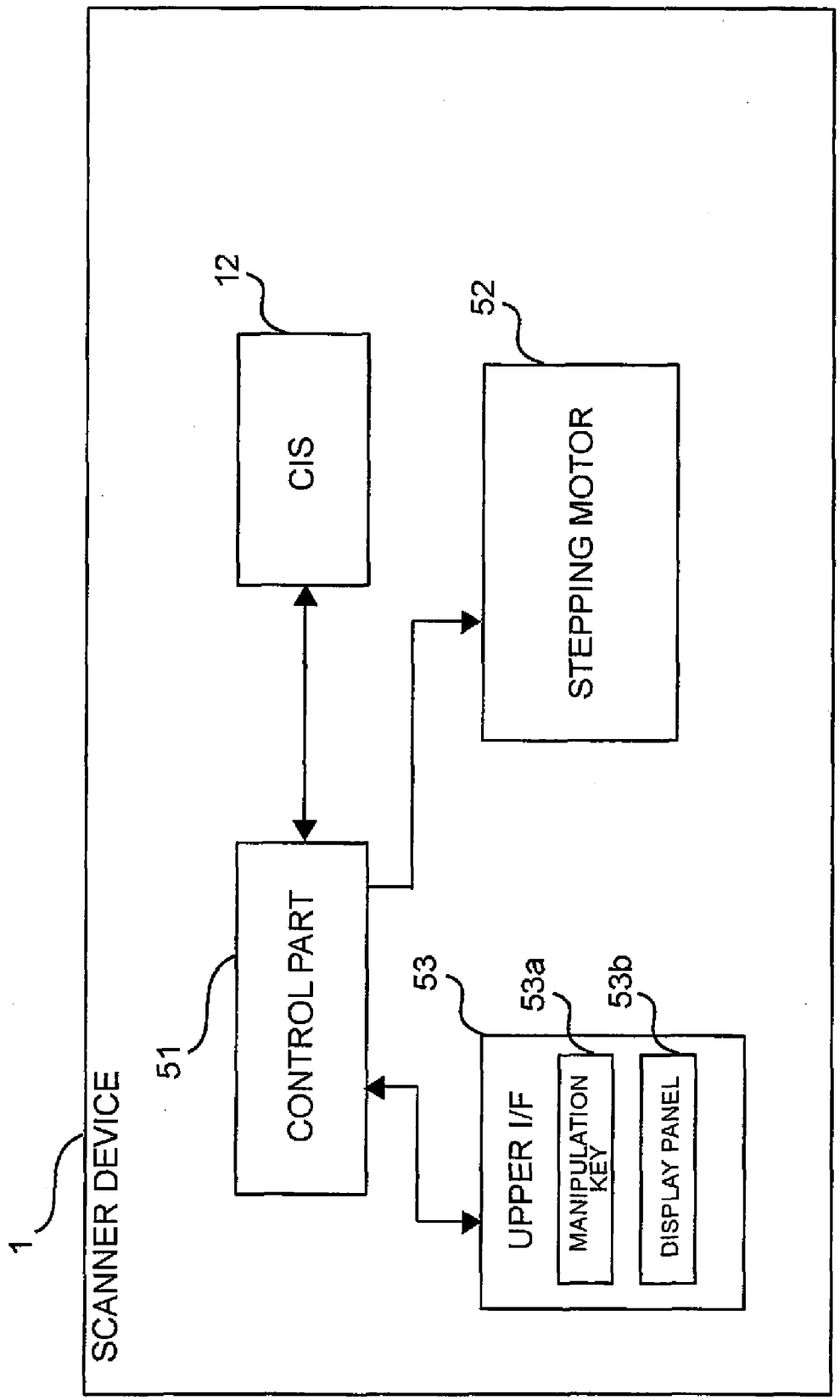
FIG. 8 is a block diagram showing the electrical construction of the scanner device 1.

Next, the electrical construction of the scanner device 1 is described. FIG. 8 is a block diagram showing the electrical construction of the scanner device 1.

The scanner device 1 includes, as shown in FIG. 8, a control part 51, a stepping motor 52, a user interface part (hereinafter referred to as the user I/F) 53, and the CIS 12. The control part 51 mainly constituted of a well-known microcomputer formed of a CPU, a ROM, a RAM and the like. The control part 51 controls the operation of the whole scanner device 1. The stepping motor 52 is configured to drive the CIS unit 10 to move in the sub scanning direction. The user I/F 53 includes a plurality of operation keys 53a which are manipulable by a user and a display panel 53b which displays various information. Here, the stepping motor 52, the user I/F 53 and the CIS 12 are connected to the control part 51.

In the scanning device 1 having such a construction, the control part 51 performs the distance adjusting processing for adjusting the glass-CIS distance.

Figure 9:
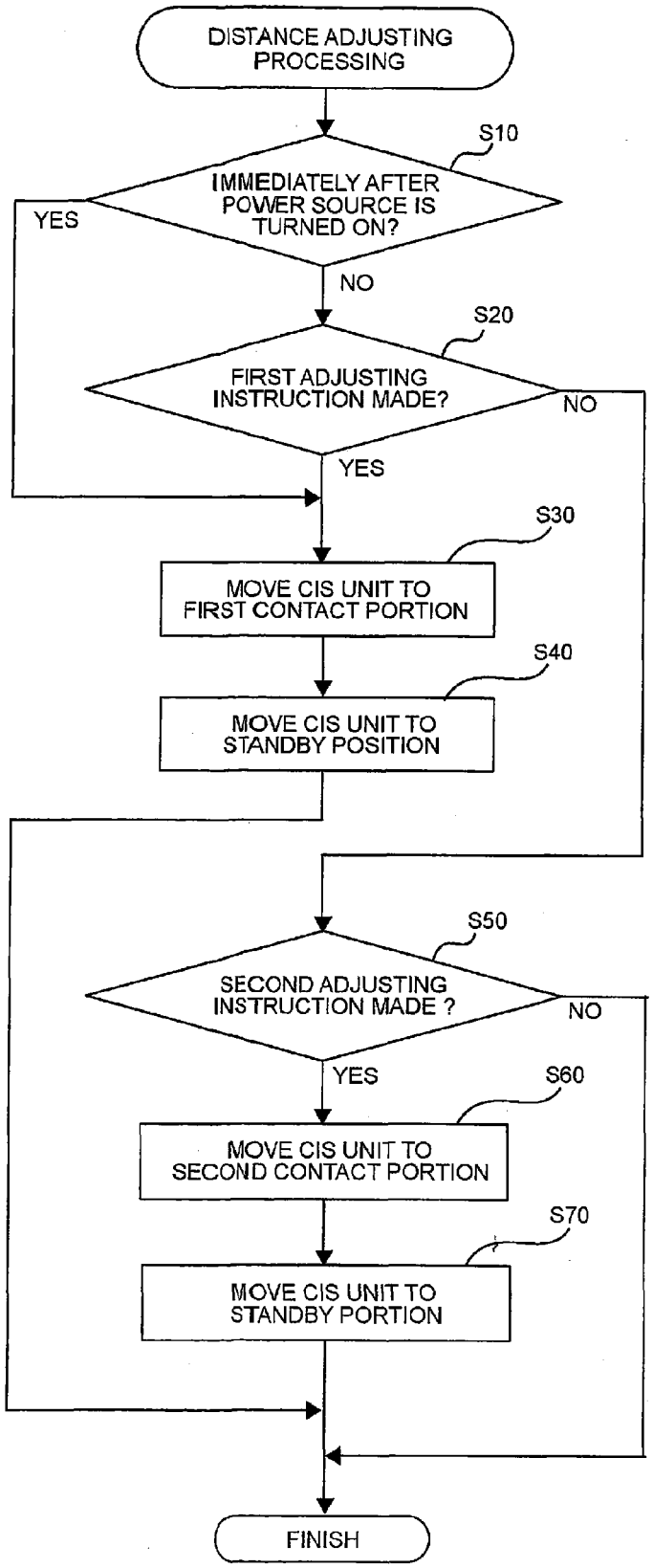
FIG. 9 is a flowchart showing steps of distance adjusting processing.

Here, steps of the distance adjusting processing which the control part 51 of the scanner device 1 executes are described in conjunction with FIG. 9. FIG. 9 is a flow chart showing the distance adjusting processing. The distance adjusting processing is repeatedly executed during a period that the control part 51 is activated (a power source being turned on).

When this distance adjusting processing is executed, the control part 51, first of all, determines whether the image reader is in a condition immediately after the power is turned on in S10. Here, when the image reader is in the condition immediately after the power is turned on (S10: YES), in step S30, the control part 51 drives the stepping motor 52 to move the CIS unit 10 in the sub scanning direction to a position at which the CIS holders 21 are brought into contact with the rib 7a (hereinafter, referred to as a first rib contact position). Then, after moving the CIS unit 10 to the first rib contact position, in step S40, the control part 51 drives the stepping motor 52 to move the CIS unit 10 to the standby position. Accordingly, the distance adjusting processing is finished.

On the other hand, when the image reader is not in the condition immediately after the power has been turned on (S10: NO), in step S20, the control part 51 determines whether an operation which gives an instruction to set the glass-CIS distance such that the focusing center position of the CIS 12 agrees with the upper surface of the platen glass 4 by way of the operation key 53a (hereinafter referred to as the first adjusting instruction operation) is performed. Here, when the first adjusting instruction operation is performed (S20: YES), the procedure advances to step S30 and the above-mentioned processing is performed. On the other hand, when the first adjusting instruction operation is not performed (S20: NO), the procedure advances to step S50.

Then, when the procedure advances to step S50, the control part 51 determines whether the operation which gives the instruction to set the glass-CIS distance such that the focusing center position of the CIS 12 is positioned above the upper surface of the platen glass 4 by way of the operation key 53a (hereinafter, referred to as the second adjusting instruction operation) is performed. Here, when the second adjusting instruction operation is not performed (S50: NO), the distance adjusting processing is finished.

On the other hand, when the second adjusting instruction operation is performed (S50: YES), in step S60, the control part 51 drives the stepping motor 52 to move the CIS unit 10 to a position where the CIS holders 21 are brought into contact with the rib 7b (hereinafter referred to as a second rib contact position) along the sub scanning direction. Then, after the CIS unit 10 is moved to the second rib contact position, in step S70, the control part 51 drives the stepping motor 52 to move the CIS unit 10 to the standby position. Then, the distance adjusting processing is finished.

In the scanning device 1 having such a construction, as the resilient body 13 biases the CIS 12 in the sensor approaching direction, the CIS 12 presses the spacer 22 in the sensor approaching direction whereby the spacer 22 presses the upper surface wall 31a in the sensor approaching direction.

The irregularities are formed on the spacer upper surface, while the irregularities which are engageable with the spacer upper surface by fitting are also formed on the inner surface of the upper surface wall. Accordingly, when the spacer upper surface and the upper-surface-wall inner surface are in a fitting state, the glass-CIS distance becomes the smallest. On the other hand, when the fitting between the spacer upper surface and the upper-surface-wall inner surface is released thus providing the projection contact state, the glass-CIS distance becomes the largest.

That is, the positional relationship between the spacer upper surface and the upper-surface-wall inner surface is changed along with the movement of the spacer 22 in the sub scanning direction, the spacer upper surface and the upper-surface-wall inner surface are changed between the fitting state and the projection contact state. Thus, the glass-CIS distance can be changed.

Accordingly, by moving the CIS unit 10 along the sub scanning direction, the glass-CIS distance can be adjusted. That is, it is unnecessary to perform the adjustment of the glass-CIS distance manually and hence, it is possible to adjust the glass-CIS distance without disassembling the image reader.

Further, when the CIS unit 10 is moved to the first rib contact position, the focusing center position of the CIS 12 agrees with the upper surface of the platen glass 4. Thus, the image reader can clearly read an image printed on a non-wrinkled sheet which is frequently read.

Further, when the CIS unit 10 is moved to the second rib contact position, the focusing center position of the CIS 12 is positioned above the upper surface of the platen glass 4. Thus, when a page or double-page spread of a book is read or when a wrinkled document is read, it is possible to suppress a phenomenon that the read image becomes obscure at a portion which is floated from the platen glass 4.

Further, when the power source of the scanner device 1 is turned on, the CIS unit 10 is moved to the first rib contact position so as to make the focusing center position of the CIS 12 agree with the upper surface of the platen glass 4. That is, the glass-CIS distance when the focusing center position of the CIS 12 agrees with the upper surface of the platen glass 4 defines an initial state of the glass-CIS distance.

Then, when the power source of the scanner device 1 is turned on, the CIS unit 10 is moved to the first rib contact position which is closer to the standby position in distance out of the first rib contact position and the second rib contact position and hence, time necessary for setting the glass-CIS distance to the initial state can be shortened.

Further, when the first adjusting instruction operation is performed by way of the operation key 53*a*, the CIS unit 10 is moved to the first rib contact position so as to make the focusing center position of the CIS 12 agree with the upper surface of the platen glass 4. Further, when the second adjusting instruction operation is performed by way of the operation key 53*a*, the CIS unit 10 is moved to the second rib contact position thus positioning the focusing center position of the CIS 12 above the upper surface of the platen glass 4.

That is, the user of the scanner device 1 can automatically adjust the glass-CIS distance by making the instruction by way of the operation key 53*a*.

Accordingly, in reading the image from a book in a spread state or the image from the wrinkled document, before starting the reading, the user of the scanner device 1 performs the second adjusting instruction operation by way of the operation key 53*a*. Thus, the focusing center position of the CIS 12 is adjusted so that an image can be prevented from being blurred even when the original includes a portion which is floated from the platen glass 4 .

In the embodiment explained heretofore, the scanner device 1 functions as the image reader, the platen glass 4 functions as the platen glass, the CIS 12 functions as the close-contact-type image sensor, the carriage 11 functions as the sensor supporting member, the stepping motor 52, the guide shaft 5 and the endless belt 6 function as the support member moving unit, the CIS holder 21, the spacers 22 and the resilient body 13 function as the distance adjusting unit, the ribs 7*a*, 7*b* function as the spacer contact member, the resilient body 13 functions as the biasing member , the upper surface wall 31*a* functions as the contact member, the user I/F 53 functions as the distance change command inputting unit, and the processing in S30 and S60 function as the moving control unit.

While the invention has been described with respect to one embodiment of the present invention heretofore, it is to be understood that the invention is not limited to the particular forms shown in the foregoing embodiment. Various modifications and alterations can be made thereto without departing from the scope of the invention.

For example, in the above embodiment, although the description is made with respect to the case in which the glass-CIS distance is changed in two stages, the glass-CIS distance may be changed in three or more stages.

Figure 10:
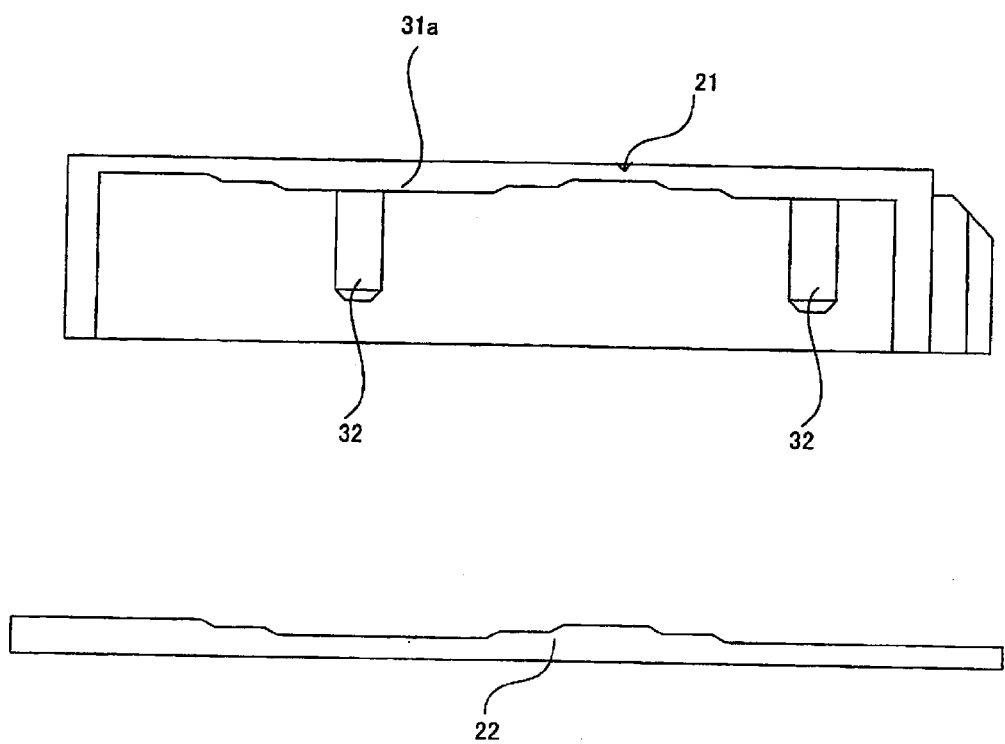
FIG. 10 is a side view of a CIS holder 21 and a spacer 22 in another embodiment.

For example, as shown in FIG. 10, the upper-surface-wall inner surface may be formed in a stepped shape having three or more steps (three steps in FIG. 10), while the spacer upper surface may be formed in a stepped shape which is engageable with the upper-surface-wall inner surface by fitting.

According to the scanner device 1 having such a construction, when the CIS unit 10 is moved along the sub scanning direction while getting over the position at which the spacer 22 is brought into contact with the rib 7*a* (rib 7*b*) (hereinafter referred to as the spacer contact position), the relative position of the spacer 22 with respect to the CIS 12 (in other words, the relative position of the spacer upper surface with respect to the upper-surface-wall inner surface) is changed in accordance with a distance the CIS unit 10 moves. Then, the glass-CIS distance is changed in three stages in accordance with such positional change.

Further, as shown in FIG. 10, when the glass-CIS distance is changeable in multiple stages, the adjustment may be performed at the time of shipment, and, thereafter, the distance adjustment unit of the invention may be offered to the user of the image reader.

Further, in the above embodiment, the description is made with respect to the case in which the glass-CIS distance is set to the initial state when the power source is turned on. However, the initialization may be performed each time an image is read or in every predetermined time.

Further, in the above embodiment, the description is made with respect to the case in which the irregularities are formed on the upper-surface-wall inner surface and the spacer upper surface. However, the glass-CIS distance may be adjusted by forming irregularities on a surface of the spacer 22 which is brought into contact with the CIS 12 and a surface of the CIS 12 which is brought into contact with the spacer 22.

Further, in the above embodiment, the description is made with respect to the case in which the user of the image reader provides instructions by way of the operation key 53*a*. However, a personal computer (PC) may be connected to the scanner device 1 and the instruction may be made by way of a scanner driver on the PC.

Further, in the above embodiment, the description is made with respect to the case in which the construction of the image reader is applied to the scanner device 1. However, the construction of the image reader may be applied to a device other than the scanner device such as a copying machine, a multi-functional machine or the like, provided that the device has a function of an image reader.

Further, one aspect of the embodiment provides an image reader which includes a platen glass having a placing surface on which an original on which an image is formed is placed; a close-contact-type image sensor having a plurality of reading elements configured to read the image, the plurality of reading elements being disposed along a main scanning direction; the sensor support member which supports the close-contact-type image sensor on a side opposite to a side at which the original is placed with the platen glass sandwiched therebetween in a state that the sensor support member faces the platen glass in an opposed manner, the sensor support member including the distance adjusting unit which is configured to change the distance between the platen glass and the close-contact-type image sensor in accordance with the change of the positional relationship between the spacer which is movable along the sub scanning direction and the close-contact-type image sensor along the movement of the spacer in the sub scanning direction; the support member moving unit which moves the sensor support member in the sub scanning direction which is set to be in parallel to the placing surface and is set to intersect the main scanning direction; and the spacer contact member which is arranged on a moving path of the spacer along the sub scanning direction and changes the relative position of the spacer with respect to the close-contact-type image sensor in response to the moving quantity of the sensor support member such that the spacer contact member is brought into contact with the spacer when the sensor support member is moved to a preset moving blocking position, and blocks the movement of the spacer when the sensor support member moves while getting over the moving blocking position.

In the image reader having such a constitution, by allowing the support member moving unit to move the sensor support member in the sub scanning direction, the image formed on the original which is placed on the platen glass is read by the close-contact-type image sensor.

Further, by allowing the support member moving unit to move the sensor support member to the moving blocking position, the spacer is brought into contact with the spacer contact member. When the sensor support member is further moved while getting over the moving blocking position, the relative position of the spacer with respect to the close-contact-type image sensor is changed corresponding to a moving quantity of the sensor support member. In response to such a positional change, the distance adjusting unit changes a distance between the platen glass and the close-contact-type image sensor (hereinafter also referred to as a glass-CIS distance). That is, by allowing the sensor support member to move while getting over the moving blocking position, it is possible to adjust a focusing center position of the close-contact-type image sensor. Here, the focusing center position implies a position at which the close-contact-type image sensor is focused.

That is, by preliminarily setting a moving quantity that the sensor support member is moved while getting over the moving blocking position for the adjustment of the focusing center position of the close-contact-type image sensor, it is sufficient to move the sensor support member by this moving quantity using the support member moving unit. That is, it is unnecessary to perform the manual operation to adjust the glass-CIS distance and hence, it is possible to adjust the distance between the platen glass and the close-contact-type image sensor without disassembling the image reader.

Further, in the image reader having such a constitution, the spacer is arranged between the platen glass and the close-contact-type image sensor in a state that the spacer is movable in the direction perpendicular to the placing surface of the platen glass, and forms irregularities on a moving-member-facing surface thereof which faces the platen glass in an opposed manner, and the distance adjusting unit includes: a biasing member which biases the close-contact-type image sensor in the sensor approaching direction which is the direction that the close-contact-type image sensor approaches the platen glass; and a contact member which is arranged between the platen glass and the spacer, forms irregularities which are engageable with the moving-member-facing surface in a fitting manner on a surface thereof which faces the moving-member-facing surface in an opposed manner, and is brought into contact with the spacer.

Further, in the image reader having such a constitution, the biasing member biases the close-contact-type image sensor in the sensor approaching direction and hence, the close-contact-type image sensor presses the spacer in the sensor approaching direction and, at the same time, the spacer presses the contact member in the sensor approaching direction.

Here, the irregularities are formed on the moving member facing surface, and the irregularities which are engageable with the moving member facing surface by fitting are also formed on a surface which faces the moving member facing surface of the contact member (hereinafter also referred to as a contact member facing surface). Accordingly, when the moving member facing surface and the contact member facing surface are engaged with each other in a fitting manner (hereinafter referred to as a fitting state), the glass-CIS distance becomes the shortest. On the other hand, when the fitting engagement between the moving member facing surface and the contact member facing surface is released and projecting portions of the moving member facing surface and projecting portions of the contact member facing surface are brought into contact with each other (hereinafter referred to as a projecting portion contact state), the glass-CIS distance becomes the longest.

That is, by changing the state between the fitting state and the projection contact state in accordance with a change of a positional relationship between the moving member facing surface and the contact member facing surface which follows the movement of the spacer in the sub scanning direction, the distance between the platen glass and the close-contact-type image sensor can be changed.

Here, as the original from which the image is read by the image reader, in general, sheets having no wrinkles are used in many cases. Accordingly, when the sheet is placed on the placing surface of the platen glass, the placing surface of the platen glass and a surface of the sheet on which the image is printed are brought into substantially close contact with each other. That is, by allowing the focusing center position of the close-contact-type image sensor to agree with the placing surface of the platen glass, it is possible to clearly read the image printed on the non-wrinkled sheet over the whole document.

Accordingly, the image reader according to the third aspect of the present invention may be, in the image reader of the first or second aspect of the present invention, configured such that the distance adjusting unit is configured to be capable of setting the distance between the platen glass and the close-contact-type image sensor such that a focusing center position of the close-contact-type image sensor agrees with the placing surface of the platen glass.

According to the image reader having such a constitution, by adjusting the distance between the platen glass and the close-contact-type image sensor such that the focusing center position of the close-contact-type image sensor agrees with the placing surface of the platen glass, it is possible to clearly read the image printed on the non-wrinkled sheet which has the high reading frequency.

Here, due to the influence of a fall, an impact or the like of the image reader, there exists a possibility that the relative position of the spacer with respect to the close-contact-type image sensor is changed and hence, the glass-CIS distance may be displaced. Accordingly, each time the reading of the image is performed, or when a power source of the image reader is turned on, or every predetermined time which is preliminarily set, it is preferable to set the glass-CIS distance to a preset initial state. Here, as described above, in general, in many cases, the image which is printed on the non-wrinkled sheet is read. Accordingly, as the initial state of the glass-CIS distance, the glass-CIS distance which allows the focusing center position of the close-contact-type image sensor to agree with the placing surface of the platen glass may preferably be used.

Further, in the image reader of the type which moves the close-contact-type image sensor in the sub scanning direction, there is provided a standby position at which the closecontact-type image sensor stands by in a state that the image reader does not read the image.

Further, the placing region in which the original is placed for reading an image is provided on the placing surface of the platen glass is provided, on the moving path along which the close-contact-type image sensor moves along the sub scanning direction, the range in which the close-contact-type image sensor faces the placing region is set as the reading moving range, and the range in which the close-contact-type image sensor does not face the placing region is set as the non-reading moving range, and the spacer contact member is mounted on the respective moving paths one for each within the non-reading moving range at two portions which are positioned at both ends of the reading moving range in the sub scanning direction, and the position which is preliminarily set for allowing the close-contact-type image sensor to stand by in a state that the image reader does not perform the reading of an image is set as a sensor standby position, the distance adjusting unit is configured such that when the spacer is brought into contact with the spacer contact member which is close to the sensor standby position in distance out of two spacer contact members, the focusing center position of the close-contact-type image sensor agrees with the placing surface of the platen glass.

That is, out of the above-mentioned two spacer contact members, the spacer contact member which is closer to the sensor standby position in distance requires a shorter time for moving the sensor supporting member (close-contact-type image sensor) to the spacer contact member from the sensor standby position. That is, when the glass-CIS distance which allows the focusing center position of the close-contact-type image sensor to agree with the placing surface of the platen glass is the initial state of the glass-CIS distance, the time necessary for setting the glass-CIS distance to the initial state can be suppressed.

Further, in the image reader described above, the image reader further includes a distance change command inputting unit to which a distance change command for changing a distance between the platen glass and the close-contact-type image sensor is inputted, and the moving control means which allows the support member moving means to move the sensor support member to a preset position for changing the relative position of the spacer with respect to the close-contact-type image sensor by bringing the spacer into contact with the spacer contact member when the distance change command is inputted to the distance change command inputting unit.

According to the image reader having such a constitution, when the distance change command is inputted through the distance change command inputting unit, the sensor support member is moved to a position which is preset for changing the relative position of the spacer with respect to the close-contact-type image sensor.

Accordingly, by allowing a user of the image reader to make an instruction through the distance change command inputting unit, it is possible to automatically adjust the glass-CIS distance.

For example, in reading the image from a book in a spread state or an image from a wrinkled document, by allowing the user of the image reader to make an instruction through the distance change command inputting unit before starting the reading, the glass-CIS distance is adjusted such that the focusing center position of the close-contact-type image sensor is displaced to a position slightly above the placing surface of the platen glass from a position where the focusing center position agrees with the placing surface of the platen glass thus realizing a using manner which prevents blurring of an image even when the document has a portion which is floated from the surface of the platen glass.

What is claimed is:

1. An image reader comprising: a platen glass having a placing surface on which an original on which an image is formed is placed; a close-contact-type image sensor having a plurality of reading elements configured to read the image, the plurality of reading elements being disposed along the main scanning direction; a sensor support member disposed facing the platen glass on a side of the platen glass opposite to a side at which the original is placed, the sensor support member being configured to support the close-contact-type image sensor; a support member moving unit configured to move the sensor support member in a sub scanning direction, the sub scanning direction being parallel to the placing surface and perpendicular to the main scanning direction; and a distance adjusting unit configured to adjust a distance between the platen glass and the close-contact-type image sensor using a slidable spacer, the spacer being configured to slide in contact with spacer contact members to adjust the distance between the platen glass and the close-contact-type image sensor, the spacer contact members being disposed parallel to the main-scanning direction to sandwich the close-contact-type image sensor therebetween.

2. An image reader comprising: a platen glass having a placing surface on which an original on which an image is formed is placed; a close-contact-type image sensor including a plurality of reading elements for reading the image, the plurality of reading elements being disposed along a main scanning direction; a sensor support member disposed facing the platen glass on a side of the platen glass opposite to a side at which the original is placed, the sensor support member being configured to support the close-contact-type image sensor; a support member moving unit configured to move the sensor support member in a sub scanning direction, the sub scanning direction being parallel to the placing surface and perpendicular to the main scanning direction; and a distance adjusting unit including a slidable spacer and spacer contact members, the spacer being disposed between the platen glass and the close-contact-type image sensor, the spacer contact members being disposed parallel to the main-scanning direction to sandwich the close-contact-type image sensor therebetween, wherein the distance adjusting unit is configured to adjust a distance between the platen glass and the close-contact-type image sensor due to sliding of the spacer initiated by contacting of the spacer with the spacer contact members.

3. An image reader according to claim 1, wherein the spacer has an irregular surface.

4. An image reader according to claim 1, wherein the spacer is configured to move in a direction perpendicular to the placing surface of the platen glass and is disposed between the platen glass and the close-contact-type image sensor, and has an irregular surface facing the platen glass, and the distance adjusting unit includes: a biasing member configured to bias the close-contact-type image sensor in a direction that the close-contact-type image sensor approaches the platen glass; and a contact member disposed between the platen glass and the spacer, the contact member being configured to contact the spacer, the contact member having an irregular surface facing the irregular surface of the spacer, the irregular surface of the contact member of the contact member fitting the irregular surface of the spacer.

5. An image reader according to claim 1, wherein the distance adjusting unit is configured to set the distance between the platen glass and the close-contact-type image sensor such that a focusing center position of the close-contact-type image sensor agrees with the placing surface of the platen glass.

6. An image reader according to claim 1, wherein the placing surface of the platen glass is provided with a placing region in which the original is placed for reading the image, a path where the close-contact-type image sensor moves along the sub scanning direction includes a first range in which the close-contact-type image sensor faces the placing region, and two second ranges in which the close-contact-type image sensor does not face the placing region, the first range is sandwiched between the second ranges in the sub scanning direction, each of the spacer contact members is mounted in a corresponding one of the second ranges, the close-contact-type image sensor is positioned in a standby position while the image reader does not read the image, the distance adjusting unit is configured such that, when the spacer is brought into contact with one of the spacer contact members which is closer to the standby position in distance, a focusing center position of the close-contact-type image sensor agrees with the placing surface of the platen glass.

7. An image reader according to claim 1, further comprising: a distance change command inputting unit to which a command for changing a distance between the platen glass and the close-contact-type image sensor is inputted; and a moving control unit configured to allow the support member moving unit to move the sensor support member to a specified position for changing a relative position of spacer with respect to the close-contact-type image sensor by bringing the spacer into contact with the spacer contact member when the command is inputted to the distance change command inputting unit.

8. An image reading method using an image reader comprising the steps of:

placing an original on which an image is formed on a platen glass; reading the image by moving a close-contact-type image sensor including a plurality of reading elements for reading an image being arranged along a main scanning direction in a sub scanning direction being perpendicular to the main scanning direction; and adjusting a distance between the platen glass and the close-contact-type image sensor by sliding a spacer which is interposed between the platen glass and the close-contact-type image sensor, wherein the sliding of the spacer is initiated by bringing the spacer into contact with spacer contact members which are disposed parallel to the main-scanning direction to sandwich the close-contact-type image sensor therebetween.

9. The image reader according to claim 1, wherein the close-contact-image sensor is configured to move vertically along with the spacer in a longitudinal direction.

10. The image reader according to claim 2, wherein the close-contact-image sensor is configured to move vertically along with the spacer in a longitudinal direction.

11. The image reader according to claim 1, further comprising a close-contact-image sensor unit, wherein a focusing center position of the close-contact-image sensor unit changes when the close-contact-image sensor unit moves in the sub scanning direction to a predetermined position.

12. The image reader according to claim 2, further comprising a close-contact-image sensor unit, wherein a focusing center position of the close-contact-image sensor unit changes when the close-contact-image sensor unit moves in the sub scanning direction to a predetermined position.

* * * * *